June 2, 1925.
G. WALKER
1,540,151
APPARATUS FOR AVERAGING VELOCITIES OF ROTATING ELEMENTS
Filed Jan. 25, 1923     3 Sheets-Sheet 1
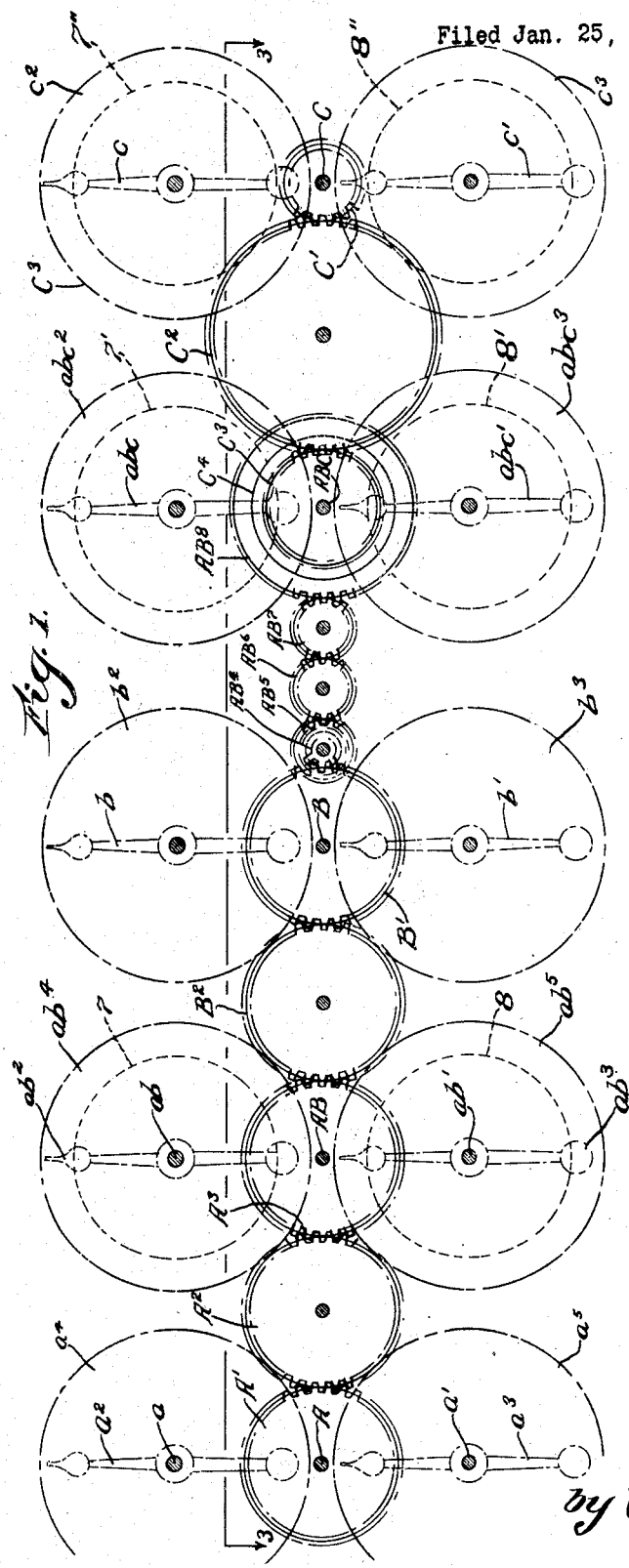
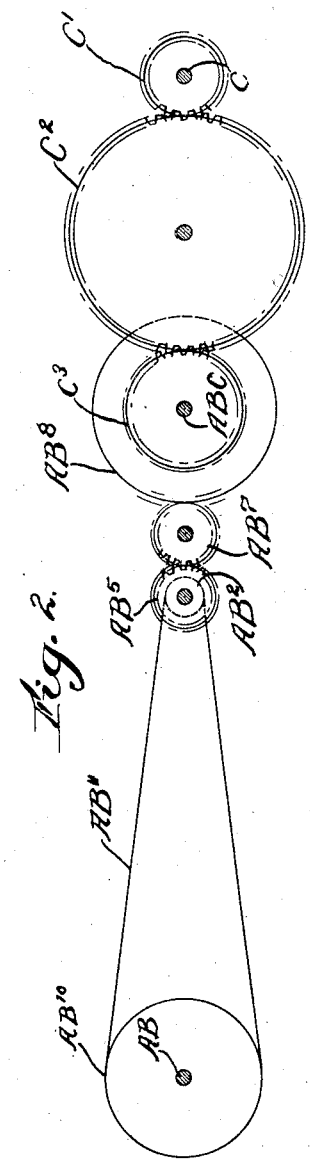
Inventor:
George Walker,
by Roberts, Roberts & Cushman
his attys.

June 2, 1925.
G. WALKER
1,540,151
APPARATUS FOR AVERAGING VELOCITIES OF ROTATING ELEMENTS
Filed Jan. 25, 1923   3 Sheets-Sheet 2
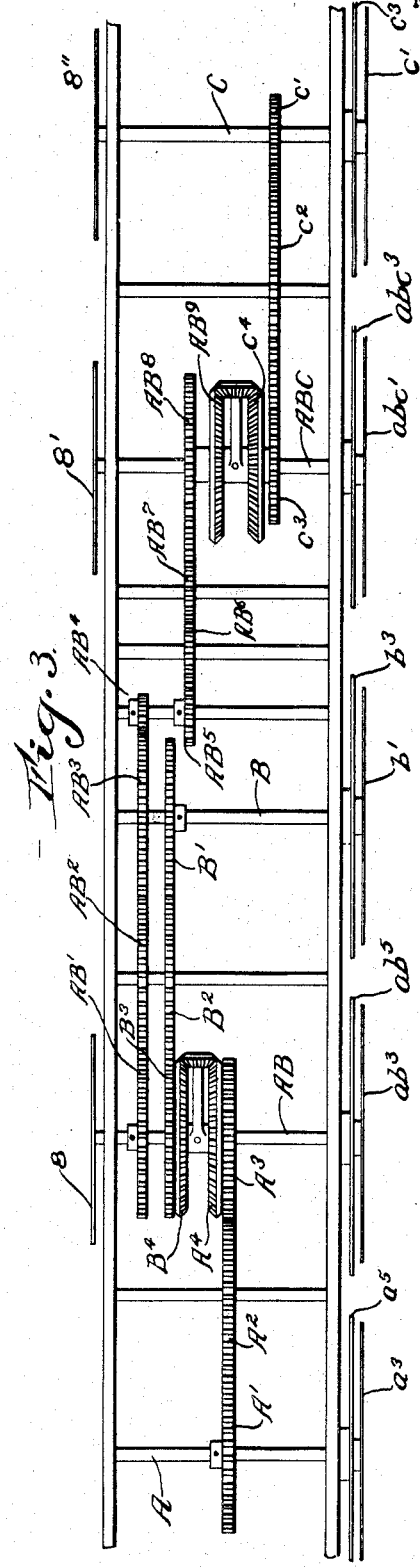
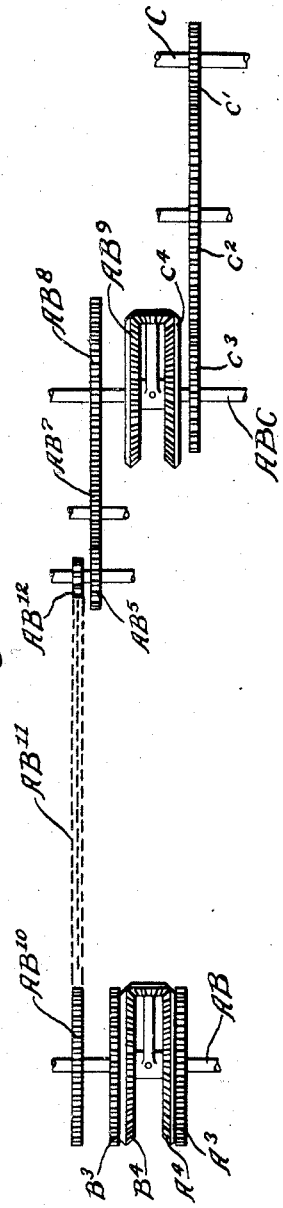
Inventor:
George Walker,
by Roberts, Roberts & Cushman
his attys.

June 2, 1925.

G. WALKER 1,540,151

APPARATUS FOR AVERAGING VELOCITIES OF ROTATING ELEMENTS

Filed Jan. 25, 1923  3 Sheets-Sheet 3

Inventor:
George Walker;
By Roberts, Roberts & Cushman
attys.

Patented June 2, 1925.

1,540,151

UNITED STATES PATENT OFFICE.

GEORGE WALKER, OF NEWTON, MASSACHUSETTS.

APPARATUS FOR AVERAGING VELOCITIES OF ROTATING ELEMENTS.

Application filed January 25, 1923. Serial No. 614,840.

*To all whom it may concern:*

Be it known that I, GEORGE WALKER, a citizen of the United States of America, and resident of Newton, in the county of Middlesex and State of Massachusetts, have invented new and useful Improvements in Apparatus for Averaging Velocities of Rotating Elements, of which the following is a specification.

This invention relates to precision instruments having apparatus for driving a rotary element at an angular velocity proportional to the average velocity of three or more rotary members and more particularly to ship's instruments for use on ships having three or more propellers which at different times may be operated singly, in pairs, or all together. In the case of a twin-screw ship the average velocity of the propeller shafts may be continuously indicated according to the disclosure in my prior application Serial No. 319,392, filed August 23, 1919, but in the case of a ship having more than two propellers the problem is distinctly different.

The objects of the present invention are accurately and automatically to indicate the average velocity of three or more shafts on other rotary elements, to indicate the average velocity of a part of the shafts independently of the other shaft or shafts, accurately and automatically to translate the average of three or more shafts or a part thereof into an indication of distance traversed, and in general to improve devices of the class described and broaden the scope of their application.

According to this invention the propeller shafts, or other rotary members as for example shafts rotating at rates proportional to the speeds of the propeller shafts respectively, are interconnected with the average speed indicator or other rotary element by means including a differential interposed between two of the rotary members and a second differential interposed between the first differential and other of the rotary members. For example, with three rotary members the second differential is interposed between the first differential and the third rotary member.

For purposes not requiring precision the differentials may be electro-magnetic but where precision is required they are preferably mechanical, a suitable construction comprising two collinear gears with a follower gear interposed therebetween, the collinear gears being driven in the same direction by the shafts or other rotary members respectively, and the follower gear driving the indicator or other rotating element at a speed equal to the average of the two collinear gears. The interconnection between the rotary members is arranged so that the aforesaid second differential rotates at a speed either equal to or otherwise proportional to the average speed of all the rotary members. By choosing the proper ratios between the first differential and its associated rotary members, this differential is caused to rotate at a rate equal to or otherwise proportional to the average velocity of the two rotary members which it interconnects.

The ratios of the gearing or other driving means connecting the differentials with the respective shafts or other rotary means, which depend upon the number of shafts, may be stated as follows, where $n$ indicates the total number of shafts and $x$ the number of shafts connected to the first aforesaid differential; the ratio of the gearing for driving the first differential should be such as to drive the follower at a rate proportional to a multiple of $\frac{1}{n}$th of the average of the velocities of the shafts driving the differential and the ratio of the gearing for driving the second aforesaid differential should be such as to drive the second differential at a rate proportional to a multiple of $\frac{1}{n}$th the average velocity of the remainder of the shafts. More specifically the ratio of the gearing for driving the first differential should be such as to drive the follower at a rate proportional to $\frac{x}{n}$th of the average velocity of the $x$ shafts to which it is responsive, and the ratio of the gearing for driving the second differential should be such as to drive the follower at a rate proportional to $\frac{n-x}{n}$th of the average velocity of the remainder $(n-x)$. Thus in the case of three shafts $(n=3)$ where the first differential is driven by two of the shafts $(x=2)$ and the second differential is interposed directly between the first differential and the third shaft, the ratio of the gearing for driving the first differential should be a multiple of $\frac{2}{3}$rds of the average velocity of the two shafts to which it is connected (viz. $\frac{4}{3}$rds), and the ratio of the gearing for driving the second differential should be a multiple of $\frac{1}{3}$rd $\left(\frac{3-2}{3}\right)$ of the velocity of the third shaft $\left(\text{viz. } \frac{2}{3}\text{rds}\right)$. That these ratios will cause the follower of the second differential to rotate at a speed equal to the average velocity of the three shafts will be evident from the following equations where A, B and C indicate the velocities of the three shafts and $x$ the average velocity of the two shafts driving the first differential.

Obviously the average velocity of three shafts is $$\frac{A+B+C}{3} = \frac{1}{3}A + \frac{1}{3}B + \frac{1}{3}C = \frac{\frac{2}{3}A + \frac{2}{3}B + \frac{2}{3}C}{2} = \frac{\frac{2}{3}(A+B) + \frac{2}{3}C}{2}$$

the average of the shafts A and B which is called $x$ is $$x = \frac{A+B}{2} \text{ and } A+B = 2x$$

substituting for $A+B$ its equal $2x$ the above equation reduces to $$\frac{\frac{2}{3}(2x) + \frac{2}{3}C}{2} = \frac{\frac{4x}{3} + \frac{2}{3}C}{2}$$

Thus the average of the three shafts is the average of $\frac{4}{3}x$ and $\frac{2}{3}C$, the ratios $\frac{4}{3}$rds and $\frac{2}{3}$rds being those referred to above.

In order more clearly to illustrate the nature of the invention reference will now be had to the accompanying drawings, in which,—

Fig. 1 is an elevational view;

Fig. 2 is a partial elevational view similar to Fig. 1, showing a modification.

Fig. 3 is a plan view substantially on the line 3—3 of Fig. 1;

Fig. 4 is a plan view of Fig. 2;

Figure 6:
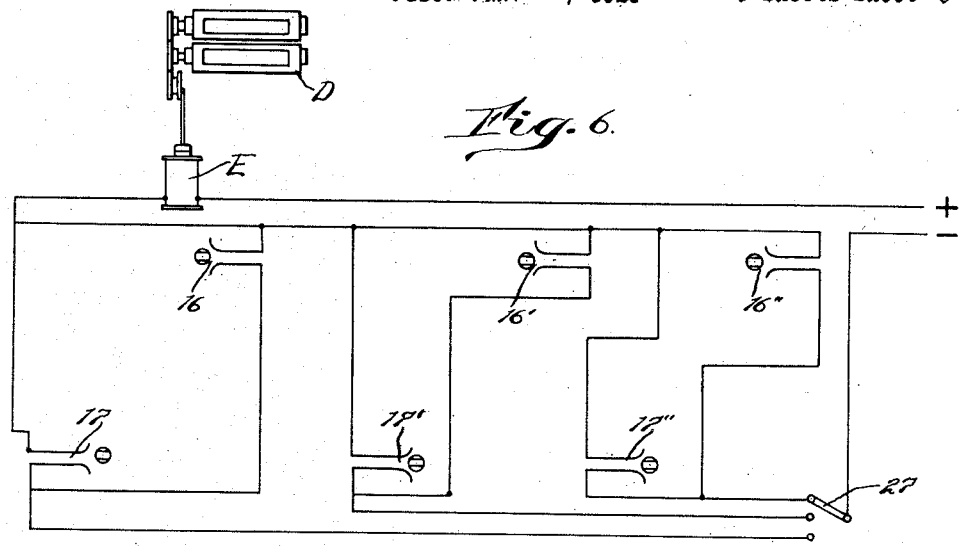
Fig. 6 is a wiring diagram for the distance control mechanism.

In the particular embodiment of the invention chosen for the purpose of illustration, A, B and C represent three rotary members which may be the propeller shafts of a triple screw ship or they may be counter shafts driven at rates respectively proportional to the propeller shafts, suitable mechanism for this purpose being shown in my prior application Serial No. 478, 190, filed June 16, 1921.

Intermediate shafts A and B is a shaft AB adapted to be driven at a speed proportional to the speeds of shafts A and B by suitable mechanism comprising a differential having a follower fast on the shaft AB and interposed between the two bevel gears $A^4$ and $B^4$ of the differential which are loose upon shaft AB. Gear $A^4$ is driven from shaft A by means of gears $A^1$, $A^2$ and $A^3$, the latter being fast to bevel gear $A^4$. In a like manner bevel gear $B^4$ is driven from shaft B by means of gears $B^1$, $B^2$ and $B^3$, the latter being fast to bevel gear $B^4$.

Interposed between shafts AB and C is a shaft ABC adapted to be driven at a speed proportional to the speeds of all three shafts, namely, A, B and C. The mechanism for thus operating shaft ABC comprises a differential having a follower fast to shaft ABC and interposed between bevel gears $AB^9$ and $C^4$ loose upon shaft ABC. Bevel gear $AB^9$ is adapted to be driven from shaft AB by suitable gearing comprising gear wheel $AB^1$, $AB^2$, $AB^3$, $AB^4$, $AB^5$, $AB^6$, $AB^7$, and $AB^8$, the latter being fast to bevel gear $AB^9$. Bevel gear $C^4$ is adapted to be driven from shaft C by suitable gearing comprising gears $C^1$, $C^2$ and $C^3$, the latter being fast on bevel gear $C^4$. In order to secure the proper ratio of driving speeds for the beveled gears of the last named differential as outlined above, gears $AB^1$, $AB^2$ and $AB^3$ are the same size the ratio of gear $AB^3$ to $AB^4$ is 4 to 1, gears $AB^5$, $AB^6$ and $AB^7$ are the same; and the ratio of gear $AB^7$ to $AB^8$ is 1 to 3 so that bevel gear $AB^9$ is driven at 4/3 the average speed of gears A and B. To secure the proper driving ratio for bevel gear $C^4$, the ratio of gear $C^1$ to gear $C^2$ is 1 to 3 and the ratio of gear $C^2$ to gear $C^3$ is 2 to 1 so that bevel gear $C^4$ is driven at 2/3 the speed of shaft C.

A modified connection from shaft AB to bevel gear $AB^9$ is shown in Figs. 2 and 3 in which the shaft carrying gear wheels $AB^4$ and $AB^5$ is substituted in place of the shaft carrying gear AB⁶ and gears AB¹ and AB⁴ are changed to sprocket wheels over which a sprocket chain is led so that the driving connection comprises sprocket wheels AB¹⁰, chain AB¹¹, sprocket wheel AB¹², gears AB⁵, AB⁷ to gear AB⁸. The same driving ratio is maintained as in the form first described.

Associated with each of shafts A, AB, B, ABC and C is a pair of parallel shafts arranged to be driven during alternate periods of time, such as alternate minutes by the shaft with which they are associated, to cause suitable revolution counters to indicate the number of revolutions made by the shaft during the predetermined period by mechanism disclosed in detail in my copending applications Ser. No. 273,744, filed January 29, 1918, Ser. No. 319,392, filed Aug. 23, 1919, Ser. No. 614,838, filed on even date herewith. The shafts associated with shaft A are $a$ and $a'$ to which are fast pointers $a^2$ and $a^3$ for rotation about dials $a^4$ and $a^5$. In a similar manner shaft AB alternately operates shafts $ab$ and $ab^1$ to which are fast pointers $ab^2$ and $ab^3$ respectively for movement around dials $ab^4$ and $ab^5$. Shaft B drives pointers $b$ and $b^1$ around dials $b^2$ and $b^3$. Shaft ABC drives pointers $abc$, $abc^1$ around dials $abc^2$ and $abc^3$. Shaft C drives pointers $c$ and $c^1$ around dials $c^2$ and and $c^3$. As clearly disclosed in the copending applications above referred to one series of pointers is at rest to indicate the number of rotations of its associated shaft during the preceding pretermined period, while the other series of pointers is counting the rotations during the next succeeding period, the former series being reset immediately prior to the end of the period during which the second series is operating.

Figure 5:
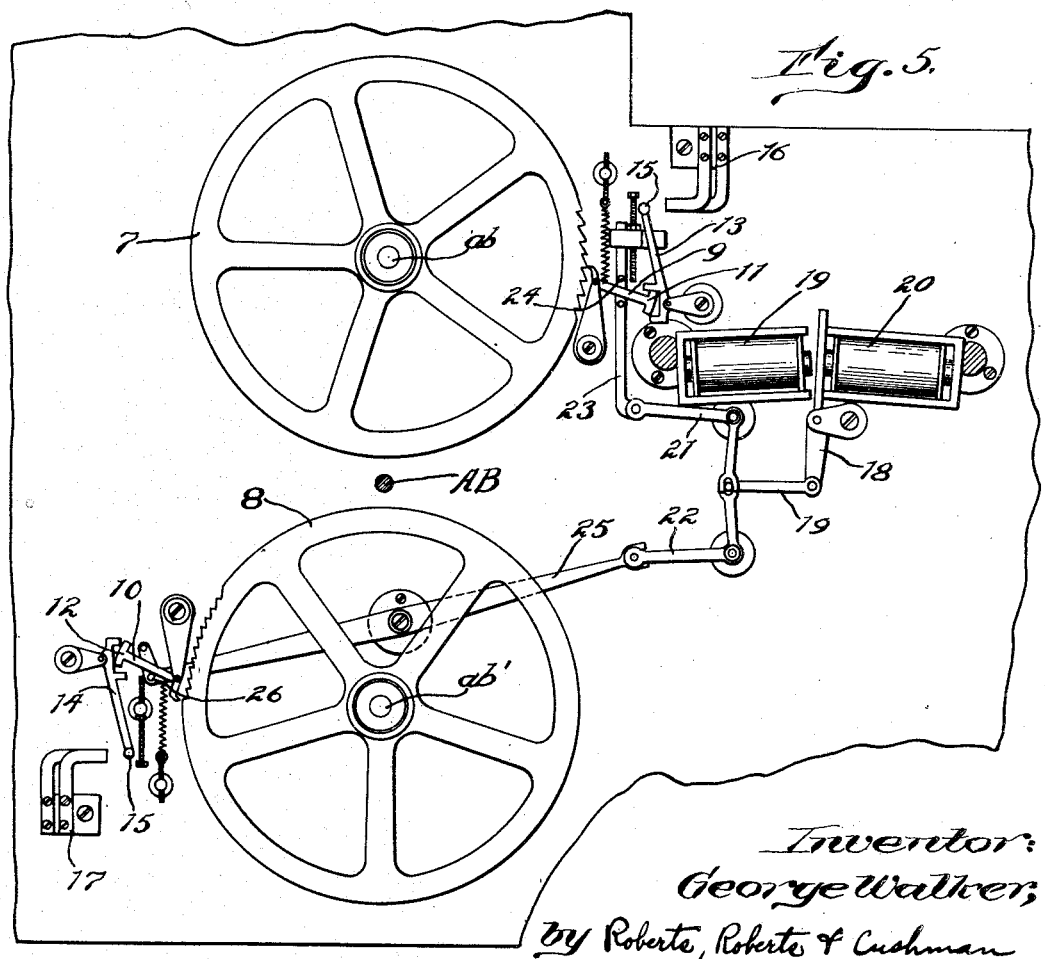
Fig. 5 is an elevational view of the distance control mechanism associated with one of the shafts.

Mechanism is also provided to indicate the distance traversed by a ship such as a triple screw ship having propellers A, B, and C, in which A and B are the port and starboard propellers respectively, and C the stern propeller and in which it is customary to drive all the propellers together or propellers A and B together or propeller C alone. This distance indicating mechanism is associated with shafts AB, ABC and C and takes the form for each of these shafts indicated in Fig. 5. Since the mechanism on each of these shafts is the same, the mechanism for one only of the shafts has been illustrated and will now be described as associated with shaft AB.

Fast upon shafts $ab$ and $ab^1$, which carry the revolution counters $ab^2$ and $ab^3$, are distance control members 7 and 8 comprising toothed wheels, the teeth on which are irregularly spaced to correspond to the distance traveled at different speeds by the ship as disclosed in my copending application Ser. No. 614,838, filed on even date herewith. These distance control members 7 and 8 actuate or rock levers 9 and 10 which, through a cam connection 11 and 12 in turn rock levers 13 and 14 each of which bears upon its free end a circuit closer 15 adapted to intermittently close the circuit between the contact members forming electric switches 16 and 17 respectively. These switches are in parallel in a circuit through an electro-magnet E for actuating a distance counter D (Fig. 6).

Since but one of the distance counters is to operate at a time and each must be reset prior to its next period of operation, suitable mechanism is necessary for retaining the levers 9 and 10 alternately out of contact with the distance controlling members during the resetting operation. This mechanism may comprise a lever 18 adapted to be alternately rocked by opposed magnets 19 and 20. Lever 18 is connected by a link 19 to two bell cranks 21 and 22, the former of which actuates a slide 23 having a stop 24 in the form of a pin adapted to engage lever 9 and hold it out of contact with member 7. Bell crank 22 rocks a lever 25 provided on its opposite ends with a stop 26 adapted to engage lever 10 and hold it out of contact with member 8. With the parts in the position shown in Fig. 5, the upper shaft $ab$ carrying distance control member 7 is in operation to register the distance and lower shaft is stopped with lever 10 held in inoperative position by stop 26 and lever 25.

As previously described shafts ABC and C likewise have distance control mechanism of the same kind associated therewith, the control members 7', 8' and 7", 8" associated therewith respectively, being indicated in Figs. 1 and 3 and the switches in the electric circuit through magnet E for operating distance indicator D being indicated in Fig. 6 by 16' and 17' for shaft ABC and by 16" and 17" for shaft C. An electric switch 27 is arranged to control the branch circuits from the distance controlling mechanisms to the distance counter, as indicated in Fig. 6, so that any one of the sets of speed indicators may be employed to operate the distance indicator depending upon whether all the propellers are in operation, or only the port and starboard propellers, or only the third propeller.

From the above it will be evident that a ship's instrument constructed as disclosed herein will count, during each predetermined period such as one minute, the rotations of each of the propeller shafts, the average rotations of two of the propeller shafts, and the average rotations of all of the propeller shafts. Furthermore it will be evident that by properly setting switch 27 a distance indication may be made whether a single propeller, two propellers or all three propellers are in use.

I claim:

1. Apparatus for differentiating the angular velocity of a number of rotary members greater than two, comprising gearing interconnecting two of the rotary members, said gearing including a differential rotatable at a speed proportional to the average speed of the two members, gearing interconnecting said differential with other of said rotary members, the last aforesaid gearing including a second differential rotatable at a speed proportional to the average speed of all the rotary members, and means for indicating the angular velocity of each of the rotary members and of each of the differentials.

2. Apparatus for differentiating the angular velocities of three rotary members, comprising gearing interconnecting two of the rotary members, said gearing including a differential rotatable at a speed proportional to the average speed of the two members, gearing interconnecting said differential with the third rotary member, the last aforesaid gearing including a second differential rotatable at a speed proportional to the average speed of all the rotary members, and means for indicating the angular velocity of each of the rotary members and of each of the differentials.

3. Apparatus for differentiating the angular velocities of three shafts, comprising two differentials, gearing connecting the two sides of one differential to two of the shafts respectively, means connecting the two sides of the other differential respectively to the third shaft and the follower of the first differential, and means for indicating the angular velocity of each of the shafts and of each of the differential followers.

4. Apparatus for differentiating the velocities of $n$ shafts, comprising a differential having two collinear gears and a follower gear interposed therebetween, means actuated by a part of said shafts for driving one of said gears at a rate proportional to a multiple of $\frac{1}{n}$th of the average of said part of the shafts, and means actuated by the remainder of said shafts for driving the other of said gears at a rate proportional to a multiple of $\frac{1}{n}$th the average velocity of the remainder.

5. Apparatus for differentiating the velocities of $n$ shafts, comprising a differential having two collinear gears and a follower gear interposed therebetween, means actuated by an $x$ part of said shafts for driving one of said gears at a rate proportional to $\frac{x}{n}$th of the average velocity of said $x$ part of the shafts, and means actuated by the remainder of said shafts for driving the other of said gears at a rate proportional to $\frac{n-x}{n}$th the average velocity of the remainder.

6. A speed indicating instrument for ships having more than two propellers comprising means for indicating the angular velocity of each propeller, means for indicating the average angular velocity of a part of the propellers, and means for indicating the average angular velocity of all the propellers.

7. A speed and distance indicating instrument for ships having more than two propellers comprising means for counting the number of revolutions of each propeller through successive intervals of time, means for indicating the average number of revolutions of a part of said propellers, means for indicating the average number of revolutions of all said propellers, means for registering the distance traversed by the ship when a part or all of the propellers are in operation, and means for selectively controlling the operation of said registering means.

Signed by me at Boston, Mass., this 20th day of November 1922.

GEORGE WALKER.